June 23, 1970     S. R. GILFORD ET AL     3,517,201

APPARATUS FOR CONTROLLING THE TRANSMITTANCE OF RADIANT ENERGY

Filed May 16, 1968     3 Sheets-Sheet 1

INVENTORS
SAUL R. GILFORD
WALTER GRENGG

BY *Silverman + Caso*

ATTORNEYS

INVENTORS
SAUL R. GILFORD
WALTER GRENGG

BY Silverman & Cass
ATTORNEYS

United States Patent Office 3,517,201
Patented June 23, 1970

3,517,201
APPARATUS FOR CONTROLLING THE TRANSMITTANCE OF RADIANT ENERGY
Saul R. Gilford, Oberlin, Ohio, and Walter Grengg, Madison, Wis., assignors to Gilford Instrument Laboratories, Incorporated, Oberlin, Ohio, a corporation of Ohio
Filed May 16, 1968, Ser. No. 729,623
Int. Cl. G02f 1/28; H01j 39/12
U.S. Cl. 250—217
32 Claims

ABSTRACT OF THE DISCLOSURE

A device for use especially in calibrating apparatus which include light responsive elements, such as photocells and photomultipliers, in which an internal or external source of radiant energy is capable of being divided into a number of parts whose respective intensities are accurately rendered equal. The device has an enclosure and a distributing chamber in which the light source is located, or to which the external source is directed. From the distributing chamber there are a plurality of light conduits extending into a mixing chamber, the number being chosen as ten so that the device operates as a decade device. The mixing chamber has an output port from which the radiant energy is projected. Each conduit has a shutter in it manipulated from externally of the enclosure, and likewise, each conduit has an adjustment or attenuation device also operated from the exterior of the enclosure to adjust the amount of light passing through the conduit. The light transmitted to the output port via each conduit when its shutter is open must be exactly the same as that transmitted via each of the other conduits. This adjustment is accomplished by opening only one shutter at a time and manipulating the attenuating device while reading a meter responding to the output from the mixing chamber. After all conduits have been adjusted, they are as equal in their contribution to the output port as capable of being measured by the meter used to adjust them. Once having equalized the contribution to output port energy contributed by respective conduits, the device can be used to simulate absorbance or transmittance in a relative manner by first ascertaining the response of the apparatus under test to the radiant energy output with all shutters open, and then noting the response with one or more closed, the ratio being used to calibrate accurately the meter of the apparatus under test.

In the case of an absorbance measuring apparatus, the device can be used directly operating into the light input of the tested apparatus and the calibration is a simple matter using the expression $$A = \text{Log}_{10} Io/It$$

where A is in absorbance units, and the expression $Io/It$ is obtained as the ratio of the total number of shutters open when measuring zero absorbance to the number of shutters open when measuring a point.

The device of the invention may be duplicated in a cascaded arrangement for extending the range of calibration points without varying intensity of source, or the points may be increased by using one device and varying the intensity of the radiant energy source.

Field of the invention

This invention relates generally to apparatus for achieving accurate measurements of the realtive amount of radiant energy transmitted from a suorce to the end that accurate calibration may be made of instruments used for measuring transmittance or absorbance. In effect, the invention may be considered to reside primarily in a radiant energy transmittance control device in effect providing a source of radiant energy which is capable of being divided into any number of portions of equal energy with an accuracy not heretofore attainable. This does not presume or require that the radiant energy output of the apparatus of the invention have any known relationship to the radiant energy input, so long as the relationship between the output parts is known.

"Radiant energy" as used herein means light of any kind capable of being measured, including visible light, ultra-violet light and infra-red radiation. This type of energy is used in many kinds of instruments, and, for any definitive information to be obtained through the use of many of the instruments or other apparatus utilized in conjunction therewith, it is essential to measure the energy which has been absorbed by or transmitted through some substance. Some instruments respond to incident light, such as for example photometers utilized in the photographic field. The value of such instruments is obviously dependent upon their accuracy, that is, upon the light measurements that are represented by them.

The type of instrument which is useful in the medical and chemical field is a device for making a colorimetric determination of some liquid, this being accomplished by passing light of a particular wave length through the liquid and measuring the amount of radiant energy which has been absorbed. Absorbance and concentration are directly related and the apparatus is of great utility in the fields mentioned.

In general, measurement of light transmittance or absorbance is important in chemistry, physiology, medicine, photography, the study of radiation, fluorescence, photoelectronics, the physical sciences and in many other sciences. These measurements presume some device which responds to light, and such response must be quantitative for acquiring dependable information from the measurements. The invention provides means for calibrating instruments of the type described, including light meters, radiation thermocouples, bolometers, and photometers of all kinds.

To emphasize the degree of accuracy achievable with the invention, it may be said that most instruments in use today are not of such basic accurate response and precision construction to utilize the degree of accuracy in calibration capable of being achieved by a carefully made device constructed in accordance with the invention.

Prior methods of calibrating radiant energy measuring devices have been crude. One obtains a so-called "standard" filter from the manufacturers of such devices, and uses it to obtain a reading of the instrument. Obviously several filters are required to achieve a calibration over any fairly broad range.

Such methods are obviously crude because any given filter is usable for a single value of absorbance or transmittance at a given wave length. Basic standard filters are made in highly specialized laboratories, such as those maintained by the U.S. Bureau of Standards. The process is difficult and tedious, requiring the use of a so-called inverse square law measuring apparatus. The resulting filters are in turn used to make others. These standards are unreliable for many reasons. Where made of glass, it is difficult to have uniformity of color in a single filter. Where made of gelatin, and even in some instances glass, the absorbance of the filter is dependent upon temperature. Filter values often change with time. Surface contamination can change filter values. All of them are wavelength sensitive, thereby decreasing their scope of use.

Fluorescence may be generated during use, thereby giving false readings.

The invention eliminates every one of the above disadvantages and provides many advantages and features which are not capable of being achieved by the use of filters.

A device constructed according to the invention is extremely economical to make; can be made quite readily with easily available tools; is not affected by temperature, wave-length, or aging; is not affected by surface contamination or the materials from which the apparatus is made; and does not require any secondary transmitting materials and hence is not affected by phenomena such as fluorescence or any other type of superfluous radiation or emission.

In its most basic concept, the apparatus of the invention provides positive means for achieving a precise control of the relative amounts of radiant energy which may be produced from a source of such energy, irrespective of the amount of energy in the source. A given source is capable of being accurately divided into a precisely equal number of parts, and the output from the apparatus is easily controllable to enable the operator to obtain energy from the apparatus representing that energy derived from any number of such parts, in the range from one part to the total of parts.

The practical application of the invention as originally conceived was to an apparatus for measuring and calibrating the response of a spectrophotometer of the type used to determine the absorbance of light in certain test liquids. In such apparatus, cuvettes containing different samples are interposed in a beam of light of a predetermined wavelength in a repetitive program and the response of a photoresponsive device is used to drive a recorder and the like. If desired measurement of absorbance may be made without recording same. Apparatus of this type is described in U.S. Pat. 3,344,702. The calibration of the photoresponsive device is very important to quantitive measurements, and the apparatus of the invention is ideally suited therefor. This is not to be considered limiting, however, since, as mentioned, the invention is applicable to a wide range of uses. The reference to an absorbance measuring apparatus of the above described type is made only to assist in an understanding of the invention by discussing a particular use thereof.

In the spectrophotometer mentioned, as well as in many light absorbance measuring devices, use is made of the expression (1) $$A = \text{Log}_{10} \frac{Io}{It}$$

in which A is the absorbance designated in "absorbance units," an arbitrary unit accepted in the art and comprising in effect a logarithm number; $Io$ is the intensity of total light or the initial light which is incident upon the sample; and $It$ is the intensity of the terminal light after passing through the sample. $It$ is the intensity of light which has been applied to the photoresponsive device and which is instrumental in energizing that device.

Considering the expression (1), the absorbance measured in absorbance units is the logarithm of the ratio of initial light to transmitted light, and obviously the greater the amount of light which has been absorbed by the sample, the higher the absorbance. Likewise, it is obvious that since the absorbance is a logarithmic number, the units of absorbance 1, 2, and 3, for example, represent transmittances of $1/10$, $1/100$ and $1/1000$ respectively.

Ideally, the apparatus responsive to light used in said above described spectrophotometer, that is the photoresponsive device, will have a characteristic that produces a logarithmic response so that the output is easily read or more susceptible to interpretation in linear recorders. This is done by modifying the output of the photoresponsive device in a logarithmic converting circuit, as for example, those described in the Sweet Pats. 2,417,023, 2,457,747, 2,478,164 and 2,492,901. According to this invention, it is not material to the use of the apparatus that the response of the detector which is being calibrated be logarithmic, but it would be quite convenient as might be understood by a study of the expression (1) and the apparatus described in the said first-mentioned patent.

Summary of the invention

The invention is dependent upon a relatively simple structure whose purpose it is to achieve careful and accurate control of the radiant energy passing through an enclosure without regard to the amount of energy injected into the enclosure. To explain this statement in a different way, a structure which is constructed in accordance with the invention provides an enclosure into which any constant radiant energy source is directed, or the source may be contained within the enclosure alternately, the enclosure having means for dividing the emerging radiant energy into a plurality of accurately known parts so that their precise relationship to one another is known. The intensity of the source or the individual parts may not be known, and indeed, need not be measured quantitatively, so long as the relationship between intensity of the parts is precise, and it is the achievement of the latter end that is taught by the invention.

The user of the apparatus knows the precise relationship of intensity between the several parts of the device, these being any fractional part of the whole or ratio of parts. Using the expression (1) it is a relatively simple matter to calibrate the photoresponsive device.

In the case of an absorbance detector, such as that utilized in the apparatus of U.S. Pat. 3,344,702, there is no need for applying a standard to obtain a single point in the response of the detector, inasmuch as the apparatus is set up so that when the reading indicated by the detector is null, there is 100% transmittance representing the logarithm of 1. In this case, the apparatus of the invention is substituted for the incident light source, such as for example the monochromatic light which would be emerging from the exit slit of the monochromator, the photoresponsive device being disposed at the output port of the enclosure. A suitable lamp or light beam provides an internal source or is applied to the entrance port and its intensity is adjusted until the detector reads null. This provides the zero absorbance point. All of the internal shutters in the apparatus are open. Thereafter, the shutters of the calibrating apparatus are operated to decrease the light output from the output port in known steps, that is (asuming ten shutters), the light is adjusted to $9/10$, $8/10$, $7/10$ and so forth. This ratio is one which represents the reciprocal of the value $Io/It$ and hence the logarithm of the reciprocal of the ratio will give the value of absorbance in absorbance units. The meter or indicator of the detector can thus be calibrated quite accurately.

The values of transmittance represented by these ratios may be extended to a great degree by use of the same apparatus. Thus, assume that a calibration run has been made down to the $1/10$ transmittance value, this being with all shutters closed, but one. The logarithm of 10/1 is 1.0000. If at this point, the shutters are all opened, giving a transmittance of 10/10 with respect to this stage, but the intensity of the source is decreased until the meter reads exactly 1.000, it is seen that a second stage of calibration can be achieved by going through the same procedure of closing the shutters one at a time and obtaining readings. When finally only one shutter is open during this second stage of the procedure, the total value of transmittance, considering also the first stage, is $1/100$ and hence absorbance is the logarithm of 10/1 which is 2 with accuracy as controlled by the precision of the reading instruments.

A single enclosure with ten shutters can be used to calibrate an absorbance reading device to a phenomenal accuracy, by stages as described. In the alternative, several of the enclosures, each having a series of shutters, and connected in cascade may be used to go through the entire procedure without the need for varying the intensity of the light source, which in this case would have to pass through all of the enclosures, seriatim.

In terms of structure, it must be assumed that all of the apparatus used with the device of the invention will be reliable and perform with predictability. For example, in the case of the light source which is required, either exterior or interior of the device, such source must be constant over the period of time that any determination is made. Obviously for any detector which is used with the apparatus, in the case of certain arrangements which are for special purposes, stability of circuitry and components over long periods of time must be presumed. In the case of any apparatus which is being calibrated and utilizes a detector, obviously this is also a requirement for reliable calibration to be achieved.

In cases where quantitative light intensity measuring apparatus are to be calibrated, the device of the invention can be used in conjunction with a light source of known intensity. Assume an exposure meter of photometer is to be calibrated. Light sources are available whose intensities are standardized in terms of standard candle-power. One such source is used to energize the meter with the temperature, distance, and so forth specified, and the response is noted. Thereafter, the source of the apparatus of the invention is adjusted so that when the output port is used as the energizing light source for the meter being calibrated, the meter reads the same value as it had when using the standard source. Thereafter, the apparatus of the invention is operated to obtain different ratios of light, and the calibration of the meter proceeds from that point.

The enclosure referred to comprises a confining structure in the form of a vessel whose interior is totally light tight except for the entrance and output ports. A light source is provided at the entrance port. This may be a lamp or other light producing element on the interior of the vessel, or an external source directed at the entrance port and passing through the same into the interior of the vessel. Means are normally provided for attenuating the intensity of the light, but since the apparatus of the invention obtains its usefulness by dividing the light passing through the same into equal parts whose relationships are known, and hence is a comparing device, the exact value of the intensity of the light source need not be known. The apparatus will operate irrespective of the nature of the light and hence the light is referred to as radiant energy herein. It may consist of visible light of any mixture of frequencies, any single wave length light, ultra-violet or infra-red radiation.

Upon entry into the interior of the vessel, or from the small distribution chamber which contains the internal source, the radiant energy is divided into a plurality of paths of equal energy contribution, the number being preferably ten to enable computations of the ratios to be rendered simple, and to form a decade device. Assuming, for example, a light source having omni-directional flux, one could construct a plurality of conduits of identical cross section each having an opening for intercepting flux at a location around the source where the flux is of equal density, speaking in terms of light, of course. In practical structures, this is achieved by having the conduits equally spaced circumferentially about the source toward the front of the vessel, that is closer to the output port. The source being on the interior would pose little difficulty, as will be explained, and here may be diffusing means between the source and the openings to the conduits, although this is not usually necessary. External light sources may be directed toward a suitable opening in the vessel which becomes in effect the light source for the apparatus. Intensity may be adjusted by diaphragms, and diffusion obtained by translucent quartz plates or opal glass.

Each of the conduits is arranged to direct its output into a diffusion or reflection chamber, the nature of which will be discussed hereinafter. The ideal structure will not permit any light to be reflected from the chamber, which may be called a mixing chamber, back into the distributing chamber in such a way that such light could be re-radiated through the conduits, so that each conduit may contribute a specific amount of light to the exit port. The light output port is located in the mixing chamber and all of the light in the chamber contributed by the several conduits is intended to emerge from the output port. Furthermore, the radiant energy contributed by each conduit, considered in terms of the net effect upon the energy measured at the output port, is adjusted to be equal. The port may be closed off by a diffusing plate of translucent quartz. The light which emerges is directed to a suitable photoresponsive device whose response it is desired to calibrate.

The nature of the invention is such that several novel arrangements for calibrating of specific apparatus can be made. This will be explained in the specification.

Each conduit has a shutter in the form of a blocking plug which can be manipulated from the exterior of the vessel, enabling the operator to control the number of conduits which will contribute radiant energy to the mixing chamber and thus to the output port. Assuming ten conduits, closing the shutters of five will produce light which has half the intensity of light produced when no shutters are closed, for example. This arrangement enables any number of tenths of the total light to be introduced to the mixing chamber and measured at the port. It should be appreciated that the energy actually emerging from the conduits into the mixing chamber may not be actually divided into ten equal amounts. The criterion is that the effect of each on the output port is adjusted to equal that of each of the others.

Each conduit also has an adjusting or attenuating device operable from the exterior of the vessel, for example, a gate or screw adapted to be moved into the conduit to intersect and partially block the light passing through the respective conduit. By these attenuating devices the operator can "trim" or "tune" each conduit so that the light contributed by each to the output port through the mixing chamber is equal.

As will be detailed below, by manipulation of the shutters and adjusting means one may follow simple procedures to achieve the desired control of transmittance of light through the apparatus in a comparative manner, which will enable accurate calibration of almost any kind of light responsive device with a high degree of accuracy and over a wide range of relative intensities. Achieving this end is probably the most important object of the invention.

As will be appreciated from a consideration of the invention, structures described and constructed in accordance therewith as detailed hereinafter are primary ratio standards for calibrating absorbance measuring apparatus and the like.

Modifications of the apparatus of the invention enable the teachings thereof to be applied over a wide range of devices for many calibration problems.

Description of the preferred embodiments

The transmittance control device of the invention is embodied in an enclosure in which a source of radiant energy is split into ten parts, and these parts are rendered equal by adjustment, following which, the operator may use one or more of the parts as desired to achieve any suitable ratio of light energy.

Figure 1:
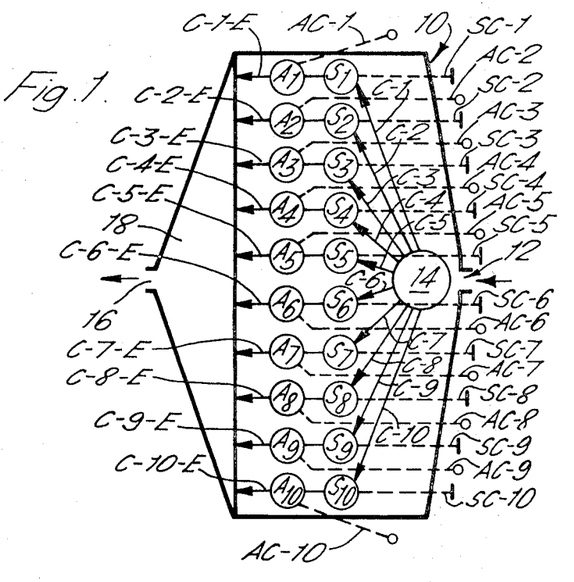
FIG. 1 is a diagram used to explain the principles and operation of the invention.

The diagram in FIG. 1 illustrates the principles of the invention in a highly simplified manner, omitting for the moment the geometrically unequal paths for the radiant energy. First, the entire structure is illustrated as enclosed in a block 10. This block represents the enclosure of a practical structure. At its right hand side there is an opening which corresponds to the entrance port 12 and the arrow thereat indicates that radiant energy may be introduced at this point. It will be seen that simple transmittance control devices have self-contained light source, and in such case the entrance port 12 will be closed off or not used. Where the outside source is used, there will be a translucent plate of glass or quartz over the entrance port 12, so that in effect the source will be located at this point. In the claims, the word "source" is intended to include any structure which provides radiant energy into the distributing chamber 14, indicated by the circle inside of the block 10. This will be true whether there is an entrance port or not.

The left hand side of the enclosure 10 has an output port 16 and as indicated by the arrow thereat, this is the exit from whence emerges the radiant energy that is produced in the device. Every transmittance control device will have an output port, but this may at times be the light source for a device connected in cascade forward of the enclosure 10.

The distributing chamber 14 has a plurality of light conducting conduits opening thereinto, there normally being 10 such conduits. In FIG. 1 there are lines with arrowheads to show the conduits and the direction the energy is transmitted, these being designated C-1 and C-10. These conduits continue through the circles which will shortly be described, and finally may be seen entering the triangular block 18 which is called a mixing chamber. At this point, the intensities of the light emerging from each conduit are theoretically equal. In the practical device, this will usually not be so, but in such a practical device as well as in the theoretical device of FIG. 1, the respective contributions made by each conduit to the total light which emerges from the output port at 16 are identical. The conduits at the mixing chamber 18 are all designated with a suffix "E" to indicate the equality mentioned above.

With equal contributions to the output energy at port 16 from each conduit, it is a simple matter to provide shutters S1 through S10, respectively in the conduits, and open as many as desired to obtain whatever ratio of output radiant energy desired. For example, for any given total intensity (with all shutters open) the ratio of 10/9, 10/8, 10/7, 10/6, and so forth, may be obtained by closing one shutter at a time, making measurements for each condition, of course. To accomplish this, the shutters are controlled from the exterior of the enclosure 10, the shutter controls being designated SC-1, SC-2, SC-3, and so forth, through SC-10. These controls are represented by a dashed line having a small handle on its end.

In the construction of the transmittance control device, it is intended that the apparatus will be made with considerable precision, but since this is quite difficult, a simple arrangement will be described in detail with the use of which the operator may easily adjust the total radiant energy emerging from and contributed by each conduit at C-1-E, C-2-E, C-3-E, and so forth. The adjusting device is in the form of a member which projects into the conduit and partially blocks the light. These adjusting controls are designated AC-1, AC-2, AC-3 and so on through AC-10, again illustrated by dashed lines with handles disposed on the exterior of the enclosure 10.

Certain practical considerations govern the construction of an actual device. The conduits should be as short as possible and without tortuous passageways. The distributing chamber 14 must be arranged so that all conduits have substantially the same length, the same shape and intercept the light from the source at points which have substantially the identical light flux. The enclosure should be light tight, notwithstanding the operation of the controls from the exterior thereof. These considerations are not too difficult to meet, but the nature of the invention is such that some compromises may be made without losing too much accuracy.

Figure 2:
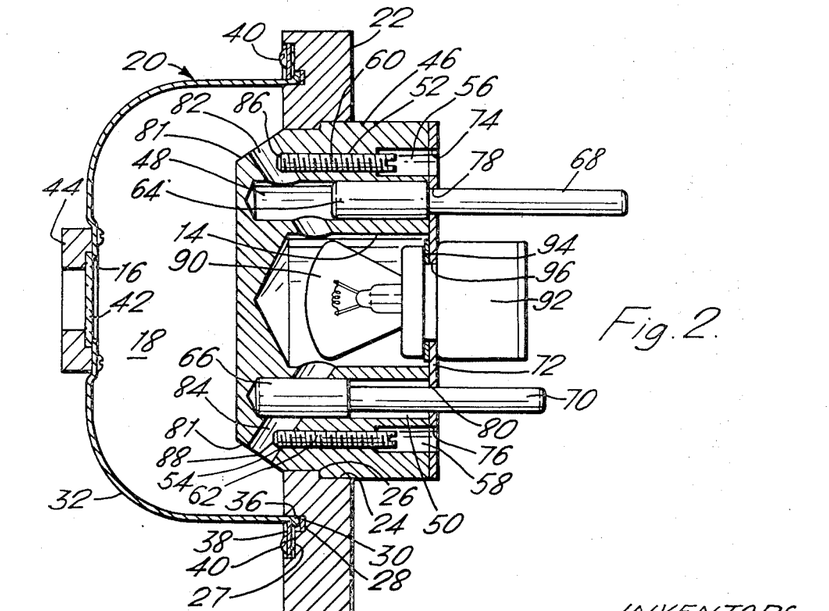
FIG. 2 is a median sectional view taken through a relatively simple, but practical transmittance control device constructed in accordance with the invention useful for calibrating photoresponsive apparatus such as spectrophotometers.

In FIG. 2 there is illustrated a practical device which is constructed from simple parts, with reasonable accuracy and is fully capable of giving excellent calibration results. The device is designated 20 and is constructed in the same basic manner as that of FIG. 1. Although a median sectional view, only two of the shutters and adjusting screws are illustrated together with their conduits and sockets in order to avoid the profusion of illustrating the elements which would be seen in elevation behind these.

The device 20 has a large plate 22 with a central circular opening 24 in which a shoulder 26 is formed. The right hand side as viewed in FIG. 2 will be called the rear of the device 20, and the left hand side the front. The front face of the plate 22 is provided with an annular groove 27 having a concentric well 28 within which is disposed a gasket ring 30. A hollow metal bowl-like vessel 32 is mounted onto the front face of the plate 22, with its annular rim 36 clamped against the gasket ring 30 by a clamping ring 38 held in the groove 27 by screws 40. The vessel base is at the left, and this is perforated to form the output port 16, there being a translucent member 42 disposed over the port 16 and held in place by the ring 44. The ring 44 provides a sleeve to enable the device 20 to be associated with an apparatus which is to be calibrated by the device 20.

A large annular block 46 is set into the opening 24 having its outer configuration stepped to enable seating thereof against the shoulder 26. The block may be made of aluminum which is easy to machine. A central cylindrical bore 14 is formed in the block, this opening to the rear of the device, and being given the reference character 14 because it functions as the light distributing chamber. A series of ten sockets is bored in the rear of the block, parallel with the axis of the chamber 14, only two of such sockets being seen in FIG. 2. The upper socket is designated 48 and the lower 50. These sockets are equi-spaced circumferentially about the chamber 14 and are all equally spaced radially outward thereof. Alongside of each socket, and also radially outwardly spaced thereof are threaded passageways, there being ten such passageways, and only two being seen in FIG. 2 at 52 and 54. A pilot or lead hole is provided for each such passageway, opening to the right hand face of the block 46, and of larger diameter, as shown at 56 and 58, so that the screws which are engaged in the threaded passageways may be retained with their heads below the surface of the block. Likewise the pilot or lead holes provide for admittance and guidance of screw-driving tools thereinto for manipulating the screws. Two screws are shown at 60 and 62, there being ten such screws.

Each of the sockets has a movable plunger therein, and the plungers have external rods to enable the manipulation thereof from the outside of the device 20. The plungers 64 and 66 shown have the rods 68 and 70 respectively, protruding through suitable openings in the cover member 72 that engages over the entire rear face of the block 46, with appropriate openings for the lead holes and to accommodate the rods. The lead holes 56 and 58 have aligned holes 74 and 76, respectively. The holes for passage of the rods 68 and 70 are designated 78 and 80, respectively.

There are ten conduits extending through the front end of the block 46, all opening into the distributing chamber 14 at their inner ends, and opening to the interior of the vessel 32 on an angled annular edge 81 of the block. The two conduits shown are designated 82 and 84. The conduits are each intersected by one of the sockets, and the relative diameters of the sockets and conduits must be such that when the plunger associated with any socket is disposed in a position to block off the conduit, there will be no light capable of passing through the conduit. This requires the diameter of the plunger to be not less than the diameter of the conduit and preferably substantially larger.

The space within the vessel 32 is designated 18 since this is the mixing chamber. The conduits exemplified by 82 and 84 are the equivalent of the conduits C–1 to C–10 of FIG. 1 and the ends of the conduits at the angled annular surface 81 are the equivalent of the portions designated C–1–E to C–10–E in FIG. 1. The plungers with their associated rods are the equivalent of the shutters S–1 to S–10 of FIG. 1 and will be referred to as shutters in the specification and claims. The screws exemplified by 60 and 62 are the equivalent of the adjusting or attenuating means A–1 to A–10 of FIG. 1. It will be noted that the inner ends of the screws protrude into the conduits, respectively, partially blocking the light which passes through the conduits. These ends form the adjusting devices which have been mentioned above, and the two seen in FIG. 2 are designated 86 and 88.

A small incandescent lamp 90 is disposed in the distributing chamber 14. It is mounted in a socket 92 that is secured to the cover plate 72 and held in light-tight connection by means of the gasket 94 in the opening 96.

The slotted ends of the screws are the equivalent of the control means designated AC–1 to AC–10 in FIG. 1 and the rods exemplified by 68 and 70 are the equivalent of the control means SC–1 to SC–10.

In the practical device constructed like the device 20 of FIG. 2 the entire interior of the mixing chamber 18 was painted white. The exposed portions of the gates and shutters and the conduits themselves preferably were black. The electrical supply for the lamp was stabilized to a substantial extent by using a constant potential power supply to energize the same.

In using the apparatus, each of the shutters is opened individually, and the output port 16 placed in position to direct its light against a photoresponsive device. The electrical response of all shutters is adjusted separately by means of the screws so that the response in every case is precisely the same. This adjustment controls the accuracy of the apparatus, and it is in turn dependent to a great extent upon the accuracy of the instrument measuring the response of the photoresponsive device.

After having made these adjustments, the device is now in a condition in which the source of light 90 can be divided into ten precise parts or any combined number of tenths, all with great precision. Operating into an absorbance measuring device, the different ratios produce the following determinations of absorbance units:

| Numbers of shutters open | Ratio Io/It | Corresponding absorbance |
| --- | --- | --- |
| 10 | 1 | 0.00000 |
| 9 | 10/9 | 0.04575 |
| 8 | 10/8 | 0.09691 |
| 7 | 10/7 | 0.15490 |
| 6 | 10/6 | 0.22184 |
| 5 | 10/5 | 0.30103 |
| 4 | 10/4 | 0.39794 |
| 3 | 10/3 | 0.52287 |
| 2 | 10/2 | 9.69897 |
| 1 | 10/1 | 1.00000 |

The significant figure of the absorbance depends upon the accuracy with which the detector connected with the photoresponsive device is invested. Obviously, for less accurate meters, the second or third place may give sufficient calibration, but it will be appreciated that if the adjustment of the light intensity produced by manipulating the individual shutters can be made with a very high degree of accuracy, the calibration can likewise be made with the same degree of accuracy. These figures for absorbance are actual computations of logarithms of the ratios.

The device 20 is capable of providing additional ratios for extending the range of calibration by a single adjustment of the intensity of the light source. Assume that the ten points of calibration have been made as described above. The operator then opens all of the shutters and decreases the light intensity of the source until the absorbance measuring meter reads exactly the same indication it had when only one shutter remained open. At this point it will be appreciated that the device is now operating on its second stage or decade. Closing the shutters one after another provides the following additional points:

| Numbers of shutters open | Ratio Io/It | Corresponding absorbance |
| --- | --- | --- |
| 10 | (10/10) (1/10) | 1+.00000=1.00000 |
| 9 | (10/9) (1/10) | 1+.04575=1.04575 |
| 8 | (10/8) (1/10) | 1+.09691=1.09691 |
| 7 | (10/7) (1/10) | 1+.15490=1.15490 | and so forth.

This can be done through several decades, depending upon the sensitivity of the measuring instrument to the decrease in light passing through the device.

The source 90 is obviously not monochromatic, and this makes the device 20 economical and highly versatile. The spectral distribution need not even be the same after successive intensity adjustments. These attributes follow because each conduit, such as 82, contributes the same amount of energy to the output port 16 as any other conduit, such as 84 regardless of the wavelength of the source. Additionally the photo emission of electrons from the photocathode of the photo responsive device at the output port is directly proportional to the number of incident photons at any given wavelength within the operating range of the said photo-cathode.

Figures 3, 4, 7:
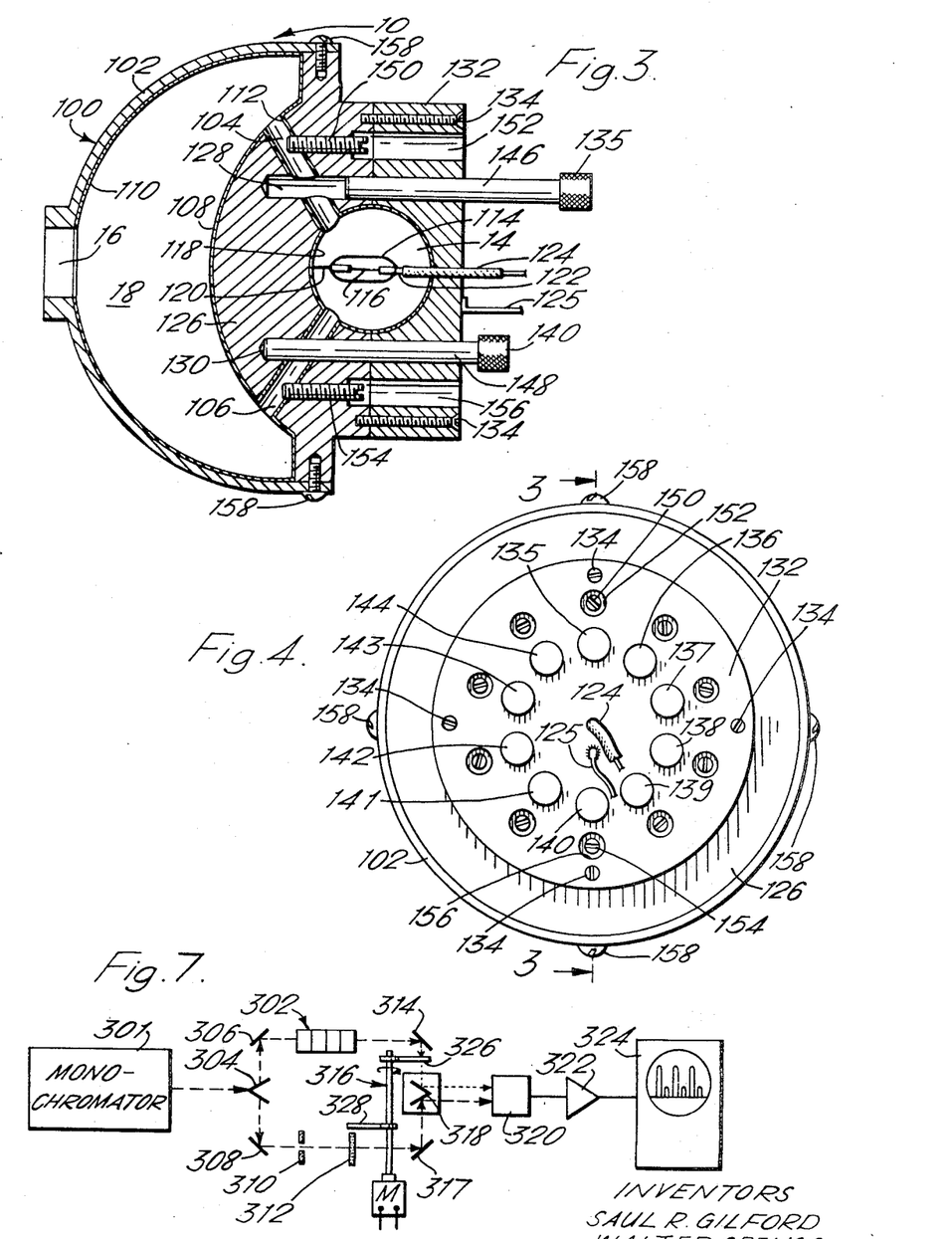
FIG. 3 is a median sectional view taken generally along the line 3—3 of FIG. 4 and in the indicated direction, illustrating a transmittance control device similar to that of FIG. 2 but in which certain structural parts have been particularly designed to eliminate as much as possible imperfections which might be found in a more practical device.
FIG. 4 is an end elevational view of the device of FIG. 3.
FIG. 7 is a diagram illustrating the manner in which a structure composed of cascaded transmittance control devices may be used in the manufacture of optical filters.

FIGS. 3 and 4 illustrate a somewhat idealized device in which greater effort is made to prevent reflection from the mixing chamber 18 back into the distributing chamber 14.

The device 100 is quite similar to that of FIG. 2 except that the light source glass envelope 114 is cylindrical and so oriented as to avoid any reflection of re-entrant light back into the conduits. The interior surfaces 108 and 110 are white for diffusion, the interior surfaces 112 of the conduits are black for a minimum of reflection of light, so that the light passing through them is practically direct. The light source in this case is a simple glass envelope 114 with a fine tungsten filament 116 located where projections of the axes of the conduits would meet. The interior of the distributing chamber 14 is spherical and its surface 118 is black. One terminal 120 is grounded and the other 122 is connected through an insulating wire 124 to the exterior of the device. Thus a grounded lead 125 and the wire 124 enable an external electric source to be used to energize the lamp 114.

In other respects the device 100 does not differ radically from that shown in FIG. 2. The block 126 has the conduits exemplified by 104 and 106 formed therein, and likewise has the sockets exemplified by 128 and 130 formed therein. A portion of the distribution chamber is formed in one surface of the block 126 and the remainder in the cover block 132. Likewise portions of the sockets are in the cover block, which is held in place by screws 134. The control screws, their lead holes, and the shutter handles are seen in an end view of the device 100 in FIG. 4. The shutter handles are designated 135, 136, 137, 138, 139, 140, 141, 142, 143 and 144. In FIG. 3 the handles or knobs 135 and 140 are shown on the ends of the shutter plungers 146 and 148, respectively. The other eight are not seen in this view. The shutter 146 is open, while the shutter 148 is closed.

The adjusting means for controlling the amount of light passing through the respective conduits are screw operated, and the screwheads are seen in their respective lead holes in FIG. 4. There is one screw and one shutter for each conduit, but only the top and bottom screws and lead holes are numbered. The top screw 150 controls the light passing through the conduit 104 and its lead hole is 152. The bottom screw 154 controls the light passing through the conduit 106 and its lead hole is 156. Screws 158 hold the vessel 102 in assembly upon the block 126.

The operation of this device 100 is obvious.

The device 100 of FIG. 3, if ideally made, would produce no re-radiation of re-entrant light due to total absorption of the black coating of the surface 118. Since this situation is normally not possible, one may make some allowance for error introduced, caused by an imperfect black surface and by reflection of re-entrant light from the filament 116 itself. It can be shown that the light output to a photometer at 16 is directly proportional to (2) $$\frac{N}{1-N^2CZ}$$

where:

N is the number of shutters open;
C is the fraction of light entering the mixing chamber 18 which returns to the distributing chamber 14 by way of one open conduit;
Z is the fraction of light entering the distributing chamber 14 through one or more conduits which is re-radiated through one open conduit.

The black coating on surface 118 and inside conduits at 112 serves to reduce the magnitude of CZ. It has been determined by direct measurement that the value of CZ for this structure 100 is about $1.3 \times 10^{-8}$. Accordingly the $N^2CZ$ term introduces a maximum difference of only 0.0000023 O.D. (optical density units or "absorbance units" as referred to in expression (1) previously mentioned) over a 4. O.D. range, from values computed on the assumption that the light output is directly proportional to N. This difference is minimal and emphasizes the inherent accuracy in practical structures. For practically all purposes, this factor can be neglected.

Variations in lamp intensity are a more serious source of error, of the order on $\pm 0.00043$ O.D. for each $\mp 0.1\%$ change in source light intensity. Photometer drift is also a contributing factor in errors. The important fact is that the structure of the device of the invention provides the least of these errors.

Figure 5:
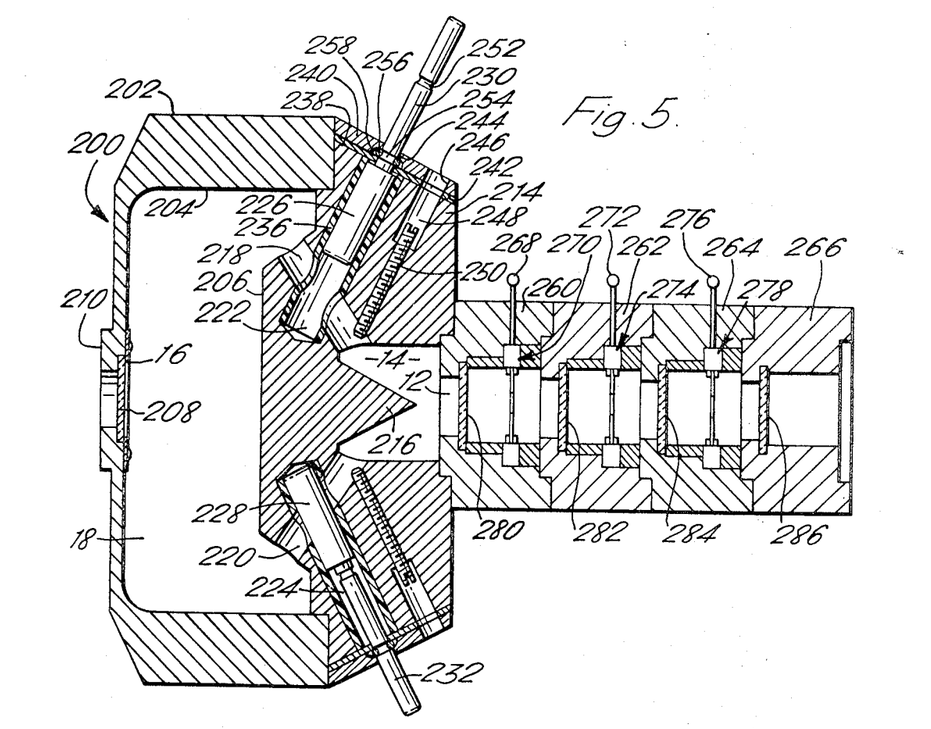
FIG. 5 is a median sectional view taken through a transmittance control device in which the source of radiant energy is external of the device and means are provided for attenuating the energy prior to dividing the same between the light paths of the device.

FIG. 5 illustrates a form of the invention in which the source of light is external of the device and is controlled by iris diaphragms. It also uses a somewhat different arrangement of shutters and controls as well as a different distributing chamber.

The device 200 has a vessel 202 forming the mixing chamber 18 with an interior cylindrical surface 204, an axial flat planar surface 206 facing the output port 16, the latter being covered by a translucent quartz plate 208. A ring formation 210 is the equivalent of the ring 44 of FIG. 2. The planar surface 206 is provided on the left hand side of the block 214 that has the conduits, sockets, and so forth, therein.

The distributing chamber 14 receives light through the entrance port 12, this light immediately being spread by a conical formation 216 integral with the block 214. The light is distributed to the outwardly extending, circumferentially distributed conduits, two of which are shown at 218 and 220 from whence the light is directed toward the surface 204 to be mixed in the chamber 18. The sockets for the shutters are not parallel with the axis of the device, as in previously described structures, but instead are arranged at an angle to the axis, intersecting the same at about 70° so that the shutters are operable from a lateral direction. Thus, the sockets 222 and 224 are shown angled up and down in the view. These intersect the conduits and are of larger diameter. The plungers 226 and 228 and their respective rods 230 and 232 which form two of the shutters are engaged in the sockets 222 and 224. Recesses to provide a safe point of accumulation for any dirt that may get on the shutters are formed by the edges of the tube insert 236 close to the light conduit path. The sockets open to an annular angled surface 238 over which there is a cover ring 240 holding a gasket 242. Openings at 244 and 246, respectively permit the rod 230 to protrude and give access to the lead hole 248 of the screw 250. Obviously there will be ten plungers, ten rods, ten screws, and ten each of the several holes described.

The rods are each provided with a pair of annular grooves, such as those shown at 252 and 254, and there is a small C-spring seated in a cavity formed at each hole 244, as for example shown at 256 and 258 respectively. This provides a detent for the action of the shutters.

The various surfaces are coated to improve the function of the device. The surface of the conical projection 216 is diffuse white or specular to reflect the light entering into the cavities. The remainder of the chamber 14 and cavities are black to reduce internal reflection and bounce. The surface 204 is specular, but the remainder of the surfaces on the interior of the chamber are black to reduce reflection of light back into chamber 14 through the open conduits. The lateral positions of the rods and screw controls enables the connection of apparatus co-axially with the device 200.

In FIG. 5, there are shown a series of housings 260, 262, 264 and 266 the first three of which have externally operable iris diaphragms of commercial construction mounted therein. The lever 268 operates the diaphragm 270; the lever 272 operates the diaphragm 274; and the lever 276 operates the diaphragm 278. The housing 266 is merely a coupling for securing a light source at the right hand end of the string of housings. Diffusing members of ground quartz are located between housings as at 280, 282, 284 and 286. The type of arrangement gives intensity control without the need for varying the actual source, and enables the light at the apparent source 280 to be varied as desired. The variation in light achieved is variable over a wide range and by controlled amounts, without the need for changing wavelength, waiting for heated sources or power elements to achieve equilibrium.

Figure 6:
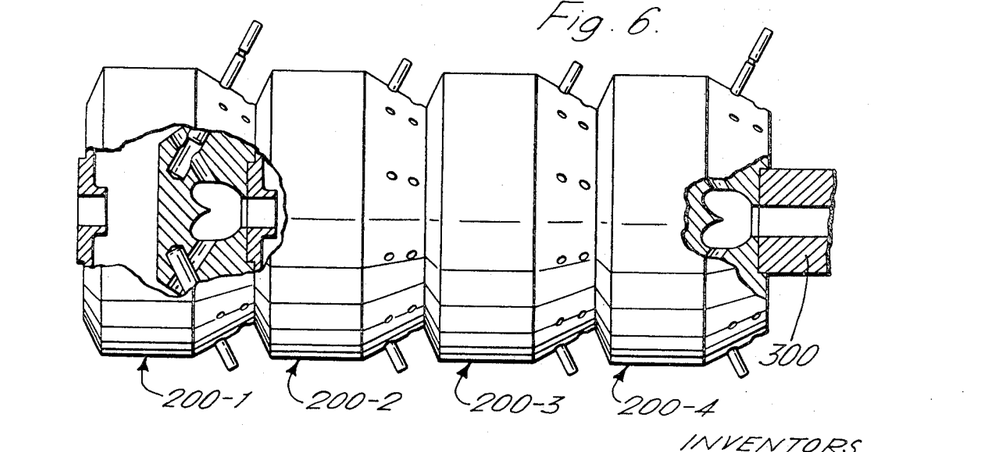
FIG. 6 is a side elevational view with portions cut away to show details, illustrating the manner in which four of the transmittance control devices of FIG. 5 are cascaded to achieve a 40 db control of transmittance without the need for changing the light intensity or using iris diaphragms.

The form of device shown in FIG. 5, with lateral shutter and attenuation controls, enables the cascade connection of units as shown in FIG. 6. Here the units 200–1, 200–2, 200–3 and 200–4 are connected in cascade with the output port of the 200–2 becoming the source of light for the entrance port of the unit 200–1; the output port of the unit 200–3 becoming the source of light for the entrance port of the unit 200–2, and so forth. The single source of radiant energy enters all the cascaded units at the connection 300 shown at the right, and the combinations of forty controls gives the operator a structure for achieving 40 db of absorbance values in calibrating a given apparatus. Closing all shutters but one in the first unit decreases the light ten-fold; then closing all but one in the next following unit decreases the light 100-fold; then closing all of the shutters but one in the next following unit decreases the light 1000-fold, and so forth. The manner of use is believed obvious, and eliminates the need for changing the brilliance or intensity of the source during any one calibration procedure.

In FIG. 7 there is illustrated a simple set-up for producing optical filters using the device of FIG. 6, here designated 302. Light of a particular wave length is produced by a monochromator 301, directed to a beam-splitter 304, half going to the transmittance control device 302 by way of reflector 306, and half going to the filter 312 through iris 310 by way of reflector 308. From the device 302 and filter 312, the light is reflected at 314 and 317 to mirror device 318 which is interrupted by a chopper 316 so that the photocell 320 receives alternate pulses from the device 302 and filter 312. These are amplified at 322 and displayed as alternate pips on a cathode ray oscilloscope 324. One form of chopper has a pair of blocking vanes 326 and 328 driven by motor M alternately shutting off light from opposite sides of mirror device 318.

To make the filter have a given absorbance, set the device 302 to zero absorbance, with all shutters wide open, and adjust the iris 310 until the peaks of the pulses on the oscilloscope are of the same amplitude. Then close down the shutters until the desired absorbance has been set into the device 302, insert the filter 312 and note the relative size of peaks. Thereafter grind and polish the filter until the peaks are equal.

Although the above specification makes reference to quantitative radiation measurements and apparatus for making filters, for example, a very important aspect of the invention should be emphasized. By the teachings of this invention it is practical to construct a simple reliable and accurate primary ratio standard for use in calibrating absorbance measuring apparatus and the like. This fills a long felt need in the art.

What it is desired to be secured by Letters Patent of the United States is:

1. A device for controlling the transmittance of radiant energy from a source to apparatus responsive to said radiant energy, which comprises:
   (A) a confining structure for transmitting radiant energy and adapted to have the source connected therewith,
   (B) a mixing chamber within said confining structure having an output port adapted to supply the radiant energy passing out of said port to said responsive apparatus,
   (C) distributing means within said confining structure and having the source means for supplying radiant energy thereinto,
   (D) means within said confining structure for transferring radiant energy from said distributing means to said mixing chamber and output port and comprising:
      (i) a plurality of paths,
      (ii) each path having means for adjusting the amount of radiant energy transmitted by said path and
   (E) means for controlling the number of paths connected between said distributing means and mixing chamber.

2. The device as claimed in claim 1 in which said source means comprise a source of radiant energy contained within said distributing means.

3. The device as claimed in claim 1 in which said source means comprise an inlet port adapted to have an external source of radiant energy connected therewith.

4. The device as claimed in claim 1 in which said distributing means comprise a chamber and the paths comprise a plurality of conduits connected between the distributing chamber and the mixing chamber.

5. The device as claimed in claim 1 in which said last mentioned means comprise a shutter in each path operable from the exterior of said confining structure.

6. The device as claimed in claim 1 in which said last mentioned means comprise shutters located respectively in said paths and operable to close said paths, and said adjusting means comprise light obstructing members respectively movable into each path for varying the amount of energy passing through said path.

7. The device as claimed in claim 6 in which said light obstructing members comprise gates independently movable from the exterior of said confining structure.

8. The device as claimed in claim 1 in which said paths comprise a plurality of conduits, each conduit having a socket of diameter greater than that of the conduit intersecting the same, and said controlling means comprise a plurality of plungers respectively disposed in said sockets, each plunger having a connecting rod extending to the exterior of the confining structure whereby to enable selective movement of said plungers within said sockets to constitute same shutters for said paths.

9. The device as claimed in claim 1 in which said confining structure comprises a hollow vessel of generally bowl-like configuration and symmetrical about an axis, said vessel having an open end and a base end, said output port being in said base end on said axis, a block structure closing off the open end of said vessel and having said distributing, transferring, controlling and source means associated therewith, and said mixing chamber being the hollow interior of said vessel between said block structure and output port.

10. The device as claimed in claim 9 in which said distributing means comprise a formation providing a chamber in said block structure symmetrical about said axis and having at least a portion of said block structure separating same from said mixing chamber.

11. The device as claimed in claim 9 in which said distributing means comprise a chamber symmetrical about said axis and axially spaced from said output port, said source means comprise an input port on said axis and communicating with said distributing chamber, whereby an external source of radiant energy may be coupled with said confining structure to apply said radiant energy to said distributing chamber.

12. The device as claimed in claim 11 in which said transferring means comprise a plurality of conduits formed in said block structure and providing the only radiant energy transmitting connections between said distributing chamber and said mixing chamber, said controlling means being associated with said conduits.

13. The device as claimed in claim 12 in which said conduits are arranged circumferentially equally spaced and are angled relaitve to said axis so that radiant energy passing into the said conduits from said distributing chamber will project radially outward and toward the output port end of said confining structure, whereby such radiant energy entering said mixing chamber and passing out said output port will do so only indirectly.

14. The device as claimed in claim 9 in which said distributing means comprise a chamber symmetrical about said axis and axially spaced from said output port, and said source means comprise a radiant energy source enclosed within said distributing chamber.

15. The device as claimed in claim 14 in which said distributing chamber has its interior surfaces provided with light absorbing means.

16. The device as claimed in claim 14 in which said transferring means comprise a plurality of conduits formed in said block structure and providing the only radiant energy transmitting connections between said distributing chamber and mixing chamber, said controlling being associated with said conduits.

17. The device as claimed in claim 16 in which the conduits are arranged circumferentialy equally spaced and are angled relative to said axis so that radiant energy passing into said conduits from said distributing chamber will project radially outward and toward the output port end of said confining structure, whereby such radiant energy entering said mixing chamber and passing out said output port will do so only indirectly.

18. The device as claimed in claim 17 in which said conduits are rectilinear and the axes thereof are arranged to provide direct alignment with said radiant energy source.

19. The device as claimed in claim 16 in which the interior surfaces of said conduits are also provided with light absorbing means.

20. The device as claimed in claim 4 in which said conduits are arranged circumferentially equally spaced and symmertically in said confining structure and angled to all have their axes meet substantially at said distributing means, while providing the only radiant energy transmitting means between said distributing means and mixing chamber.

21. Apparatus for controlling the transmittance of radiant energy, comprising:
(A) a confining structure for transmitting energy and adapted to have a source of radiant energy connected therewith,
(B) means for transferring radiant energy from said source to one hollow portion of the interior of said confining structure,
(C) an outlet port for permitting at least some of the radiant energy of said source which was transferred to said one part to leave said confining structure, and said outlet port being in communication with a second hollow portion of said interior,
(D) means within said confining structure providing a plurality of paths for radiant energy between said hollow portions otherwise being blocked, and means for selecting the number of paths open.

22. The apparatus as claimed in claim 21 in which means are provided for controlling the relative amount of energy passed through said respective paths.

23. Apparatus as claimed in claim 21 in which means are provided to control the relative effect of each path upon the amount of radiant energy passed out of said outlet port.

24. The apparatus as claimed in claim 21 in which said last means comprise a shutter capable of blocking off each path operable from the exterior of said confining structure.

25. The apparatus as claimed in claim 24 in which means are provided for controlling the relative amount of energy passed through the respective paths, comprising gates movable from exterior of said confining structure and projectible at least part way into the respective paths.

26. Apparatus comprising a plurality of the devices as claimed in claim 1 in which said devices are connected in cascade, with the output port of one device of adjacent devices connected to the distributing means of the other device of adjacent devices so that the radiant energy emerging from said output port provides a source of radiant energy for the said other device.

27. Apparatus comprising a plurality of the devices as claimed in claim 11 in which said devices are connected in cascade, with the output port of one device of adjacent devices connected to the input port of the other device of said adjacent devices so that the radiant energy emerging from said output port provides said external source of radiant energy for said other device.

28. The device as claimed in claim 3 in which said inlet port includes means for varying the amount of radiant energy entering said confining structure.

29. The device as claimed in claim 28 in which said last means comprise at least one adjustable iris diaphragm.

30. The device as claimed in claim 8 in which said sockets are arranged parallel one to the other and in a circular disposition, whereby the said rods emerge from an end of said confining structure.

31. The device as claimed in claim 8 in which said sockets are arranged in a conical disposition whereby the sad rods emerge in a circular array about the lateral portion of said confining structure.

32. A method of calibrating a light responsive device trrough the use of a source of radiant energy and in terms of relative values of response, which comprises:
(A) providing a stable source of radiant energy,
(B) dividing at least some energy from said source into a plurality of equal parts capable of being transmitted individually or collectively in any number of parts,
(C) transmitting the part or mixture of parts to said light responsive device in a single intermixed quantity and relating the indication of response in accordance with the ratio of responses for different amounts of radiant energy so transmitted.

References Cited
UNITED STATES PATENTS 2,896,508    7/1959    Biedermann    356—233 X

FOREIGN PATENTS 1,193,268    5/1965    Germany.

RALPH G. NILSON, Primary Examiner

C. M. LEEDOM, Assistant Examiner

U.S. Cl. X.R.

240—46.3; 250—220, 228, 229; 350—266; 356—225, 228, 233